(12) United States Patent
Yu et al.

(10) Patent No.: US 11,435,633 B2
(45) Date of Patent: Sep. 6, 2022

(54) LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Zhe Yu, Guangdong (CN); Bangyin Peng, Guangdong (CN); Ilgon Kim, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 175 days.

(21) Appl. No.: 16/770,966

(22) PCT Filed: May 20, 2020

(86) PCT No.: PCT/CN2020/091322
§ 371 (c)(1),
(2) Date: Jun. 9, 2020

(87) PCT Pub. No.: WO2021/227109
PCT Pub. Date: Nov. 18, 2021

(65) Prior Publication Data
US 2022/0113599 A1    Apr. 14, 2022

(30) Foreign Application Priority Data
May 12, 2020  (CN) .................. 202010398032.7

(51) Int. Cl.
*G02F 1/1362*   (2006.01)
*G02F 1/1333*   (2006.01)
*G02F 1/1335*   (2006.01)

(52) U.S. Cl.
CPC .. *G02F 1/136286* (2013.01); *G02F 1/133345* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 2012/0050193 A1* | 3/2012 | Noguchi | G06F 3/0445 345/173 |
| 2016/0253030 A1* | 9/2016 | Tada | G06F 3/04166 345/174 |

(Continued)

FOREIGN PATENT DOCUMENTS

| | | |
|---|---|---|
| CN | 103681775 A | 3/2014 |
| CN | 106653819 A | 5/2017 |

(Continued)

*Primary Examiner* — Shan Liu

(57) ABSTRACT

An embodiment of the present application provides a liquid crystal display panel, including a color filter substrate having at least one first auxiliary trace disposed on a lower surface thereof; an array substrate having a low voltage area disposed on an upper surface thereof, wherein the low voltage area is disposed with a plurality of low voltage signal traces; and at least one connecting metal pair, wherein each of the connecting metal pairs includes two connecting metals, and the two connecting metals are disposed between the color filter substrate and the array substrate to electrically connect two ends of one of the low voltage signal traces to two ends of the first auxiliary trace.

7 Claims, 2 Drawing Sheets

(56) References Cited

U.S. PATENT DOCUMENTS

| | | | | |
|---|---|---|---|---|
| 2017/0123253 A1* | 5/2017 | Sugita | ............. | G06F 3/0412 |
| 2017/0255288 A1* | 9/2017 | Wang | ............. | G06F 3/041 |
| 2018/0188615 A1* | 7/2018 | Li | ............. | G09G 3/3648 |
| 2020/0144351 A1 | 5/2020 | Liu et al. | | |
| 2020/0266215 A1 | 8/2020 | Dong et al. | | |
| 2020/0321356 A1* | 10/2020 | Shang | ............. | G02F 1/136286 |

FOREIGN PATENT DOCUMENTS

| | | | |
|---|---|---|---|
| CN | 107863373 A | | 3/2018 |
| CN | 109192767 A | | 1/2019 |
| CN | 109407435 A | | 3/2019 |
| CN | 109728054 A | | 5/2019 |
| CN | 109728065 A | | 5/2019 |
| CN | 109933234 A | | 6/2019 |
| CN | 110061147 A | * | 7/2019 |
| CN | 110061147 A | | 7/2019 |
| CN | 110071226 A | | 7/2019 |
| CN | 110600528 A | | 12/2019 |
| CN | 110635066 A | | 12/2019 |

* cited by examiner

LIQUID CRYSTAL DISPLAY PANEL

FIELD OF INVENTION

The present application relates to a field of display technology, and more particularly to a liquid crystal display (LCD) panel.

BACKGROUND

In 8K TFT-LCD liquid crystal display panels, due to a large size thereof, there are many signal lines with greater lengths, which makes loading of the signal lines become too large. When a resistance in a low voltage area is too large during LOC, an in-plane RC delay will be severe, which will affect display quality of the display panels.

Therefore, the existing technology has defects and needs to be improved urgently.

SUMMARY

The purpose of embodiments of the present application is to provide a liquid crystal display panel, which has an effect of reducing a resistance of a voltage area, so as to achieve beneficial effects of reducing RC delay.

An embodiment of the present application provides a liquid crystal display (LCD) panel, comprising:

a color filter substrate, having at least one first auxiliary trace disposed on a lower surface thereof;

an array substrate, having a low voltage area disposed on an upper surface thereof, wherein the low voltage area is disposed with a plurality of low voltage signal traces; and at least one connecting metal pair, wherein each of the connecting metal pairs comprises two connecting metals, and the two connecting metals are disposed between the color filter substrate and the array substrate to electrically connect two ends of one of the low voltage signal traces to two ends of the first auxiliary trace;

wherein a number of the first auxiliary trace is multiple;

wherein a number of the connecting metal pair is the same as the number of the first auxiliary trace, and the connecting metal pair and the first auxiliary trace correspond one to one; and wherein the two connecting metals of each of the connecting metal pairs respectively electrically connect the first auxiliary trace to the two ends of the corresponding low voltage signal trace, so that each of the first auxiliary traces are respectively connected to the corresponding low voltage signal trace in parallel, and the connecting metals are connecting metal balls.

In the liquid crystal display panel according an embodiment of the present application, each of the first auxiliary traces and the corresponding low voltage signal trace are directly opposite to each other and have the same shape and size.

In the liquid crystal display panel according an embodiment of the present application, each of the first auxiliary traces is partially opposite to the corresponding low voltage signal trace, and opposite portions thereof have the same shape.

In the liquid crystal display panel according an embodiment of the present application, a number of the first auxiliary traces is multiple; and some of the low voltage signal traces among the multiple low voltage signal traces are electrically connected to the corresponding multiple first auxiliary traces one to one through the multiple connection metal pairs.

In the liquid crystal display panel according an embodiment of the present application, the multiple low voltage signal traces comprise a plurality of first low voltage signal traces;

wherein at least one of the first auxiliary signal traces comprises multiple second auxiliary traces;

some or all of the first low voltage signal traces of the multiple first low voltage signal traces are correspondingly connected to the multiple second auxiliary traces one to one through the connecting metal pairs, thereby making a parallel equivalent resistance of the first low voltage signal trace and the corresponding second auxiliary trace be a fixed value.

In the liquid crystal display panel according an embodiment of the present application, some or all of the second auxiliary traces in the multiple second auxiliary traces have different widths or lengths.

In the liquid crystal display panel according an embodiment of the present application, the array substrate comprises a substrate, a first metal layer, an insulating layer, and a second metal layer, and the first metal layer is disposed on the substrate, the insulating layer is disposed on the first metal layer, and the second metal layer is disposed on the insulating layer;

wherein the second metal layer forms the multiple low voltage signal traces in the low voltage area;

wherein the first metal layer forms at least one third auxiliary trace;

wherein the insulating layer is disposed with at least one pair of conductive metallized holes, each pair of conductive metallized holes comprises two conductive metallized holes, and two conductive metallized holes of each pair of the conductive metallized holes electrically connect both ends of one third auxiliary trace to both ends of one low voltage signal trace.

In the liquid crystal display panel according an embodiment of the present application, the number of the third auxiliary trace is multiple;

wherein the number of the pairs of conductive metallized holes is the same as the number of the third auxiliary traces, and the pairs of conductive metallized holes and the third auxiliary traces correspond one to one;

wherein two conductive metallized holes of each of the pair of conductive metallized holes electrically connect a third auxiliary trace to the two ends of the corresponding low voltage signal trace, so that each third auxiliary trace is connected to the corresponding low voltage signal trace in parallel.

An embodiment of the present application further provides a liquid crystal display panel, comprising:

a color filter substrate, having at least one first auxiliary trace disposed on a lower surface thereof;

an array substrate, having a low voltage area disposed on an upper surface thereof, wherein the low voltage area is disposed with a plurality of low voltage signal traces; and at least one connecting metal pair, wherein each of the connecting metal pairs comprises two connecting metals, and the two connecting metals are disposed between the color filter substrate and the array substrate to electrically connect two ends of one of the low voltage signal traces to two ends of the first auxiliary trace.

Embodiments of the present application reduce the resistance value by adopting auxiliary traces connected in parallel disposed at two ends of the low voltage signal trace, so as to achieve the purpose of reducing the resistance of the low voltage area, thereby achieving the beneficial effect of reducing RC delay.

In the liquid crystal display panel according an embodiment of the present application, a number of the first auxiliary traces is multiple;

wherein a number of the connecting metal pair is the same as the number of the first auxiliary trace, and the connecting metal pair and the first auxiliary trace correspond one to one; and wherein the two connecting metals of each of the connecting metal pairs respectively electrically connect the first auxiliary trace to the two ends of the corresponding low voltage signal trace, so that each of the first auxiliary traces are respectively connected to the corresponding low voltage signal trace in parallel, and the connecting metals are connecting metal balls.

In the liquid crystal display panel according an embodiment of the present application, each of the first auxiliary traces and the corresponding low voltage signal trace are directly opposite to each other and have the same shape and size.

In the liquid crystal display panel according an embodiment of the present application, each of the first auxiliary traces is partially opposite to the corresponding low voltage signal trace, and opposite portions thereof have the same shape.

In the liquid crystal display panel according an embodiment of the present application, a number of the first auxiliary traces is multiple; and wherein some of the low voltage signal traces among the multiple low voltage signal traces are electrically connected to the corresponding multiple first auxiliary traces one to one through the multiple connection metal pairs.

In the liquid crystal display panel according an embodiment of the present application, the multiple low voltage signal traces comprise a plurality of first low voltage signal traces;

wherein at least one of the first auxiliary signal traces comprises multiple second auxiliary traces;

some or all of the first low voltage signal traces of the multiple first low voltage signal traces are correspondingly connected to the multiple second auxiliary traces one to one through the connecting metal pairs, thereby making a parallel equivalent resistance of the first low voltage signal trace and the corresponding second auxiliary trace be a fixed value.

In the liquid crystal display panel according an embodiment of the present application, some or all of the second auxiliary traces in the multiple second auxiliary traces have different widths or lengths.

In the liquid crystal display panel according an embodiment of the present application, the connecting metals are connecting metal balls.

In the liquid crystal display panel according an embodiment of the present application, the array substrate comprises a substrate, a first metal layer, an insulating layer, and a second metal layer, and the first metal layer is disposed on the substrate, the insulating layer is disposed on the first metal layer, and the second metal layer is disposed on the insulating layer;

wherein the second metal layer forms the multiple low voltage signal traces in the low voltage area;

wherein the first metal layer forms at least one third auxiliary trace;

wherein the insulating layer is disposed with at least one pair of conductive metallized holes, each pair of conductive metallized holes comprises two conductive metallized holes, and two conductive metallized holes of each pair of the conductive metallized holes electrically connect both ends of one third auxiliary trace to both ends of one low voltage signal trace.

In the liquid crystal display panel according an embodiment of the present application, the number of the third auxiliary trace is multiple;

wherein the number of the pairs of conductive metallized holes is the same as the number of the third auxiliary traces, and the pairs of conductive metallized holes and the third auxiliary traces correspond one to one;

wherein two conductive metallized holes of each of the pair of conductive metallized holes electrically connect a third auxiliary trace to the two ends of the corresponding low voltage signal trace, so that each third auxiliary trace is connected to the corresponding low voltage signal trace in parallel.

Embodiments of the present application reduce the resistance value by adopting auxiliary traces connected in parallel disposed at two ends of the low voltage signal trace, so as to achieve the purpose of reducing the resistance of the low voltage area, thereby achieving the beneficial effect of reducing RC delay.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Figure 1:
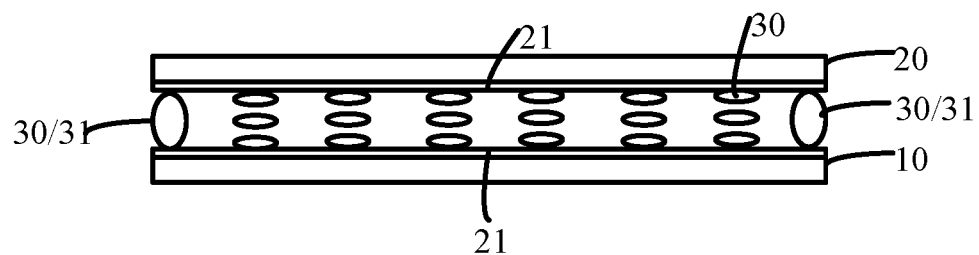
FIG. 1 is a schematic diagram of a first structure of a liquid crystal display panel provided by an embodiment of the present application.

Technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

It should be noted that similar reference numerals and letters indicate similar items in the following drawings, therefore, once an item is defined in one drawing, there is no need to further define and explain it in subsequent drawings. Meanwhile, in the description of the present application, the terms "first", "second", etc. are only used to distinguish the description and cannot be understood as indicating or implying relative importance.

Figure 2:
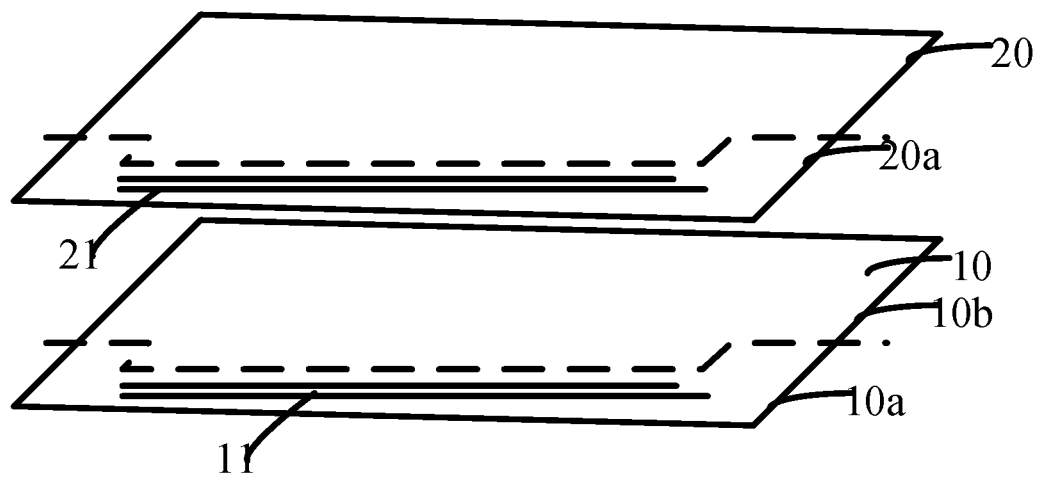
FIG. 2 is a schematic diagram of a second structure of a liquid crystal display panel provided by an embodiment of the present application.

Please refer to FIG. 1 and FIG. 2, a liquid crystal display panel comprises an array substrate 10, a color filter substrate 20, a liquid crystal molecule layer 40 interposed between the array substrate 10 and the color filter substrate 20, and at least one connecting metal pair 30.

Herein, an upper surface of the array substrate 10 is disposed with a low voltage area 10*a* and a high voltage area 10*b*, the high voltage area 10*b* is provided with a plurality of high voltage signal traces, and the low voltage area 10*a* is disposed with a plurality of low voltage signal traces 11. At least one first auxiliary trace 21 is disposed on a lower surface of the color filter substrate 20. The connecting metal pair 30 comprises two connecting metals 31, and the two connecting metals 31 are disposed between the color filter substrate 20 and the array substrate 10 to electrically connect two ends of one of the low voltage signal traces 11 to one of the first auxiliary traces 21, thereby reducing a resistance of the low-voltage signal trace 11 and RC delay.

Herein, the connecting metals 31 are connecting metal balls.

The low-voltage area 10*a* is located in the non-display area of the array substrate 10. The array substrate 10 is also disposed with other thin film transistor (TFT) array driving structures, which are existing technologies and need not be described in detail.

The color filter substrate 20 is also disposed with other optical functional layers, which belong to the existing technologies and need not be described in detail.

The liquid crystal molecule layer 40 can use existing common liquid crystal molecules, which belong to the prior art and need not be described too much.

Specifically, the first auxiliary traces 21 may be formed of indium tin oxide (ITO) metal, and an ITO metal layer formed on the lower surface of the color filter substrate may use a photomask process to form the auxiliary traces 21 distributed corresponding to the low voltage signal traces 11 on the array substrate.

In some embodiments, the number of the first auxiliary traces 21 is multiple, and the number of the connecting metal pairs 30 is the same as the number of the first auxiliary traces 21, which are formed correspondingly one to one. The two connecting metals 31 of each of the connecting metal pair 30 electrically connect a first auxiliary trace 21 to both ends of a corresponding low-voltage signal trace 11, respectively, so that each of the first auxiliary traces 21 respectively electrically connects to the corresponding low voltage signal trace 11 in parallel.

It is noted that, in some embodiments, the number of the first auxiliary traces 21 is multiple, and some of the low voltage signal traces 11 of the multiple low voltage signal traces 11 are electrically connected to the multiple first auxiliary traces 21 one to one, respectively. That is, each low voltage signal trace 11 has a first auxiliary trace 21 electrically connected in parallel, and different low voltage signal traces 11 are electrically connected to different first auxiliary traces 21 in parallel.

It is noted that, in some embodiments, the number of the first auxiliary traces 21 is multiple, and some of the low voltage signal traces 11 among the multiple low voltage signal traces 11 are electrically connected to the multiple first auxiliary traces 21 through the multiple metal pairs 30 one to one, respectively. That is, some of the low voltage signal traces 11 are electrically connected with the first auxiliary traces 21 in parallel, and some of the low voltage signal traces 11 are not electrically connected with the first auxiliary trace 21 in parallel.

Herein, in order to facilitate layouts and connections of the first auxiliary traces 21, each of the first auxiliary traces 21 and the corresponding low voltage signal traces 11 are directly opposite to each other and have the same shape and size. Alternatively, in some embodiments, each of the first auxiliary traces is partially opposite to the corresponding low voltage signal traces, and the opposite portions have the same shape.

In some embodiments, the multiple low voltage signal traces 11 comprise multiple first low voltage signal traces, and at least one of the first auxiliary traces 21 comprises multiple second auxiliary traces. For example, the first low voltage signal traces are all cathode traces or low-level clock signal traces. Some or all of the first low voltage signal traces of the multiple first low voltage signal traces are correspondingly connected to the multiple second auxiliary traces one to one through the connecting metal pairs, so that a parallel equivalent resistance of the first low voltage trace to the corresponding second auxiliary traces is a fixed value. That is, in order to achieve same equivalent resistances of the multiple first low voltage signal traces, it can choose to electrically connect the second auxiliary traces in parallel or not, and the resistance value of the parallel auxiliary traces is based on the fixed value to set it up. For example, some or all of the plurality of second auxiliary traces may have different widths or lengths.

It is noted that from the above, in the embodiments of the present application, by using auxiliary traces connected in parallel at both ends of the low voltage signal trace, its resistance value is reduced, and the purpose of reducing the resistance of a low voltage area is achieved, thereby achieving the beneficial effect of reducing RC delay.

Figure 3:
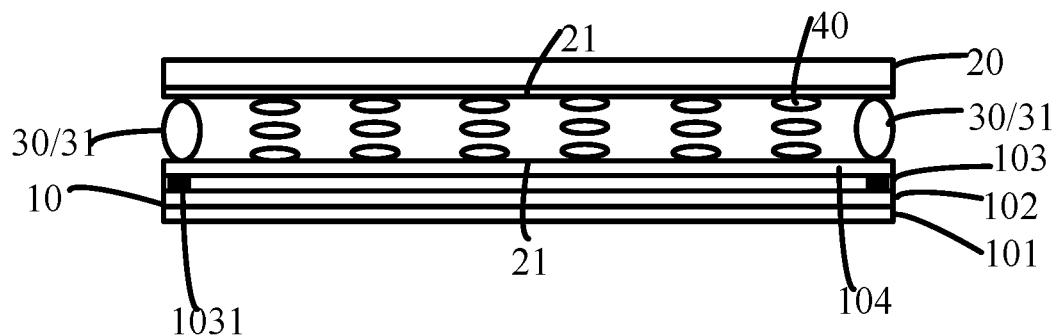
FIG. 3 is a schematic diagram of a third structure of a liquid crystal display panel provided by an embodiment of the present application.
Figure 4:
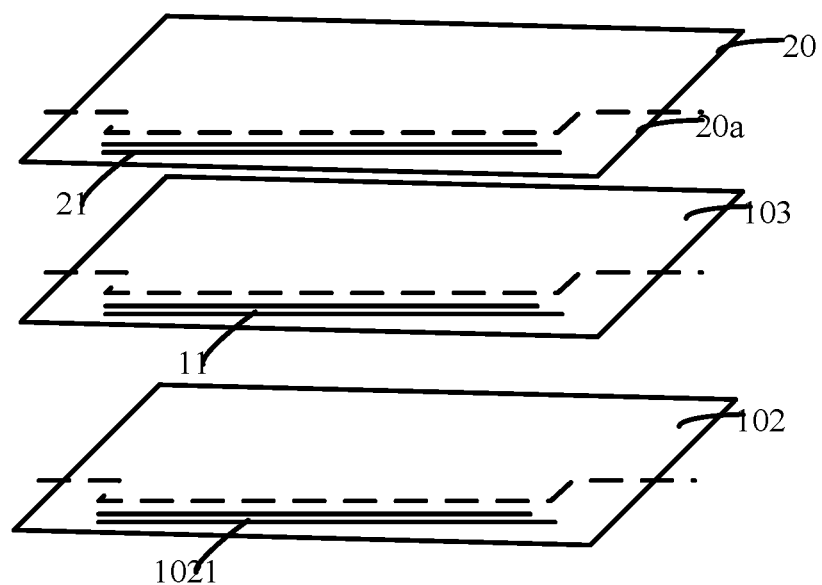
FIG. 4 is a schematic diagram of a fourth structure of a liquid crystal display panel provided by an embodiment of the present application.

Please refer to FIG. 3 and FIG. 4, the array substrate comprises a substrate 101, a first metal layer 102, an insulating layer 103, and a second metal layer 104. The first metal layer 102 is disposed on the substrate 101, the insulating layer 103 is disposed on the first metal layer 102, and the second metal layer 104 is disposed on the insulating layer 103.

Herein, the second metal layer 104 forms the multiple low voltage signal traces 21 in a low voltage area, and the first metal layer 102 forms at least one third auxiliary trace 1021. At least one conductive metallized hole pair is formed in the insulating layer, and each of the conductive metallized hole pairs comprises two conductive metallized holes 1031, and the two conductive metallized holes 1031 of each conductive metallized hole pairs connect the two ends of the third auxiliary trace 1021 and electrically connects the two ends of a low voltage signal trace.

In some embodiments, the number of the third auxiliary traces 1021 is multiple, and the number of conductive metallized hole pairs 1031 is the same as the number of the third auxiliary traces 1021, which are correspondingly connected one to one.

The two conductive metallized holes 1031 of each conductive metallized hole pair respectively electrically connect a third auxiliary trace 1021 and the two ends of the corresponding low voltage signal trace 21, so that each of the third auxiliary traces electrically connects with the corresponding low voltage signal trace 21 in parallel, respectively. It is noted that, in some embodiments, each low voltage signal trace 21 and its parallel third auxiliary trace 1021 and the first auxiliary trace have the same equivalent resistance. Therefore, in order to achieve the same equivalent resistance, it is needed to design resistance values of the third auxiliary trace 1021 and the first auxiliary trace in combination with the resistance of the low voltage signal trace 21, so that the same equivalent resistance is realized.

It is noted that, in some embodiments, the number of the third auxiliary traces 1021 is less than the number of the low voltage signal traces 21. That is, only a portion of the low voltage signal traces among the multiple low voltage signal traces 21 electrically connect the third auxiliary trace 1021 in parallel.

It is noted that, in some embodiments, some of the plurality of low voltage signal traces 21 correspond to the plurality of first auxiliary traces on the lower surface of the color filter substrate 20 one to one, respectively, and other portions of the low voltage signal traces 21 of the multiple low voltage signal traces 21 correspond to the multiple third auxiliary traces 1021 formed by the first metal layer one to one, so that each low voltage signal trace 21 is electrically connected to one auxiliary trace in parallel. Preferably, in some embodiments, the low voltage signal trace 21 disposed as the first auxiliary trace on the color filter substrate 20 and the low voltage signal trace 21 disposed as the third auxiliary trace on the first metal layer are sequentially spaced apart. Therefore, by separately disposing auxiliary traces on the lower surface of the color filter substrate and the first metal layer of the array substrate, a separation distance between the auxiliary traces can be reduced, and the beneficial effect of reducing interference can be achieved.

It can be seen from the above that in the embodiments of the present application, by using auxiliary traces connected in parallel at both ends of the low voltage signal trace to reduce its resistance value, the purpose of reducing the resistance of the low voltage area is achieved, thereby achieving the beneficial effect of reducing RC delay.

In this article, relational terms such as first and second are used only to distinguish one entity or operation from another entity or operation, and do not necessarily require or imply that any such actual relationship or order.

Embodiments of the present application have been described in detail above, and specific examples have been used to explain the principles and implementations of the present application. The descriptions of the above embodiments are only used to help understand the technology of the present application, solutions and their core ideas; those of ordinary skill in the art should understand that they can still modify the technical solutions described in the foregoing embodiments or equivalently replace some of the technical features, and these modifications or replacements do not make the essence of the corresponding technical solutions deviate from the scope of the technical solutions of the embodiments of the present application.

What is claimed is:

1. A liquid crystal display panel, comprising:
   a color filter substrate, having at least one first auxiliary trace disposed on a lower surface thereof;
   an array substrate, having a low voltage area disposed on an upper surface thereof, wherein the low voltage area is disposed with a plurality of low voltage signal traces; and
   at least one connecting metal pair, wherein each of the at least one connecting metal pair comprises two connecting metals, and the two connecting metals are disposed between the color filter substrate and the array substrate to electrically connect two ends of one of the low voltage signal traces to two ends of the at least one first auxiliary trace;
   wherein a number of the at least one first auxiliary trace is multiple;
   wherein a number of the at least one connecting metal pair is same as the number of the at least one first auxiliary trace, and the connecting metal pairs and the first auxiliary traces correspond one to one;
   wherein the two connecting metals of each of the connecting metal pairs respectively electrically connect one first auxiliary trace to the two ends of the corresponding low voltage signal trace, so that each of the first auxiliary traces is respectively connected to the corresponding low voltage signal trace in parallel, and the connecting metals are connecting metal balls;
   wherein the multiple low voltage signal traces comprise a plurality of first low voltage signal traces;
   wherein at least one of the first auxiliary traces comprises multiple second auxiliary traces;
   wherein some or all of the first low voltage signal traces of the multiple first low voltage signal traces are correspondingly connected to the multiple second auxiliary traces one to one through the connecting metal pairs, thereby making a parallel equivalent resistance of one first low voltage signal trace and the corresponding second auxiliary trace be a fixed value; and
   wherein some or all of the second auxiliary traces in the multiple second auxiliary traces have different widths or lengths.

2. The liquid crystal display panel according to claim 1, wherein each of the first auxiliary traces and the corresponding low voltage signal trace are directly opposite to each other and have a same shape and size.

3. The liquid crystal display panel according to claim 1, wherein each of the first auxiliary traces is partially opposite to the corresponding low voltage signal trace, and opposite portions thereof have a same shape.

4. The liquid crystal display panel according to claim 1, wherein some of the low voltage signal traces among the multiple low voltage signal traces are electrically connected to the corresponding multiple first auxiliary traces one to one through the multiple connection metal pairs.

5. The liquid crystal display panel according to claim 1, wherein the array substrate comprises a substrate, a first metal layer, an insulating layer, and a second metal layer, and the first metal layer is disposed on the substrate, the insulating layer is disposed on the first metal layer, and the second metal layer is disposed on the insulating layer;
   wherein the second metal layer forms the multiple low voltage signal traces in the low voltage area;
   wherein the first metal layer forms at least one third auxiliary trace; and
   wherein the insulating layer is disposed with at least one pair of conductive metallized holes, each pair of conductive metallized holes comprises two conductive metallized holes, and the two conductive metallized holes of each pair of conductive metallized holes electrically connect both ends of one third auxiliary trace to both ends of one low voltage signal trace.

6. The liquid crystal display panel according to claim 5, wherein a number of the at least one third auxiliary trace is multiple; wherein a number of the at least one pair of conductive metallized holes is same as the number of the at least one third auxiliary traces, and the pairs of conductive metallized holes and the third auxiliary traces correspond one to one; wherein the two conductive metallized holes of each pair of conductive metallized holes electrically connect one third auxiliary trace to the both ends of the corresponding low voltage signal trace, so that each third auxiliary trace is connected to the corresponding low voltage signal trace in parallel.

7. The liquid crystal display panel according to claim 1, wherein the connecting metals are connecting metal balls.

* * * * *